United States Patent
Huh et al.

(10) Patent No.: US 9,355,633 B2
(45) Date of Patent: *May 31, 2016

(54) COMMUNICATION DEVICE TRANSFORMING TEXT MESSAGE INTO SPEECH

(71) Applicant: LG ELECTRONICS INC., Seoul (KR)

(72) Inventors: Ji Young Huh, Seoul (KR); Sun Ryang Kim, Suwon-si (KR); Woong Chang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

This patent is subject to a terminal disclaimer.

(21) Appl. No.: 14/327,417

(22) Filed: Jul. 9, 2014

(65) Prior Publication Data

US 2014/0324437 A1 Oct. 30, 2014

Related U.S. Application Data

(63) Continuation of application No. 13/924,199, filed on Jun. 21, 2013, now Pat. No. 8,781,834, which is a continuation of application No. 13/645,232, filed on Oct. 4, 2012, now Pat. No. 8,510,114, which is a continuation of application No. 12/400,537, filed on Mar. 9, 2009, now Pat. No. 8,285,548.

(60) Provisional application No. 61/035,043, filed on Mar. 10, 2008.

(51) Int. Cl.
| | |
|---|---|
| *G10L 13/02* | (2013.01) |
| *G10L 13/04* | (2013.01) |
| *G10L 13/00* | (2006.01) |
| *H04M 1/60* | (2006.01) |
| *H04M 1/725* | (2006.01) |

(52) U.S. Cl.
CPC ............... *G10L 13/02* (2013.01); *G10L 13/00* (2013.01); *G10L 13/043* (2013.01); *H04M 1/6066* (2013.01); *H04M 1/72552* (2013.01)

(58) Field of Classification Search
USPC ......................................................... 704/260
See application file for complete search history.

(56) References Cited

U.S. PATENT DOCUMENTS

| | | | |
|---|---|---|---|
| 6,963,839 B1 | 11/2005 | Ostermann et al. | |
| 7,177,801 B2 | 2/2007 | Krasnanski et al. | |
| 7,379,872 B2 | 5/2008 | Cabezas et al. | |
| 7,697,668 B1 | 4/2010 | Ostermann et al. | |
| 7,706,510 B2 | 4/2010 | Ng | |
| 8,005,677 B2 * | 8/2011 | Cutaia ................... | G10L 13/033 704/260 |

(Continued)

FOREIGN PATENT DOCUMENTS

EP  1 892 936 A1  2/2008

*Primary Examiner* — Douglas Godbold
(74) *Attorney, Agent, or Firm* — Birch, Stewart, Kolasch & Birch, LLP

(57) ABSTRACT

The application discloses a communication device and method of processing a text message in the communication device. An aspect of the present application is a method of receiving text messages from a counterpart; determining whether to transform the received text messages into voice data according to control information, wherein the control information corresponds to a condition for transforming the text messages into the voice data; selectively transforming a text message among the text messages into the voice data of the counterpart according to a result of the determining step; and transmitting the transformed voice data to a sound reproduction device.

19 Claims, 10 Drawing Sheets

(56) References Cited

U.S. PATENT DOCUMENTS

| | | |
|---|---|---|
| 8,015,010 B2 | 9/2011 | Basir |
| 8,103,509 B2 | 1/2012 | Burns et al. |
| 8,781,834 B2 * | 7/2014 | Huh .................. G10L 13/00 704/260 |
| 2002/0013708 A1 | 1/2002 | Walker et al. |
| 2002/0169610 A1 | 11/2002 | Luegger |
| 2003/0028380 A1 | 2/2003 | Freeland et al. |
| 2006/0217982 A1 | 9/2006 | Munro |
| 2007/0078656 A1 * | 4/2007 | Niemeyer ............... G10L 13/02 704/260 |
| 2007/0124142 A1 | 5/2007 | Mukherjee |
| 2007/0260460 A1 * | 11/2007 | Hyatt ................ H04M 1/72547 704/260 |
| 2008/0147409 A1 | 6/2008 | Taormina |
| 2009/0043583 A1 | 2/2009 | Agapi et al. |
| 2009/0055187 A1 | 2/2009 | Leventhal et al. |

* cited by examiner

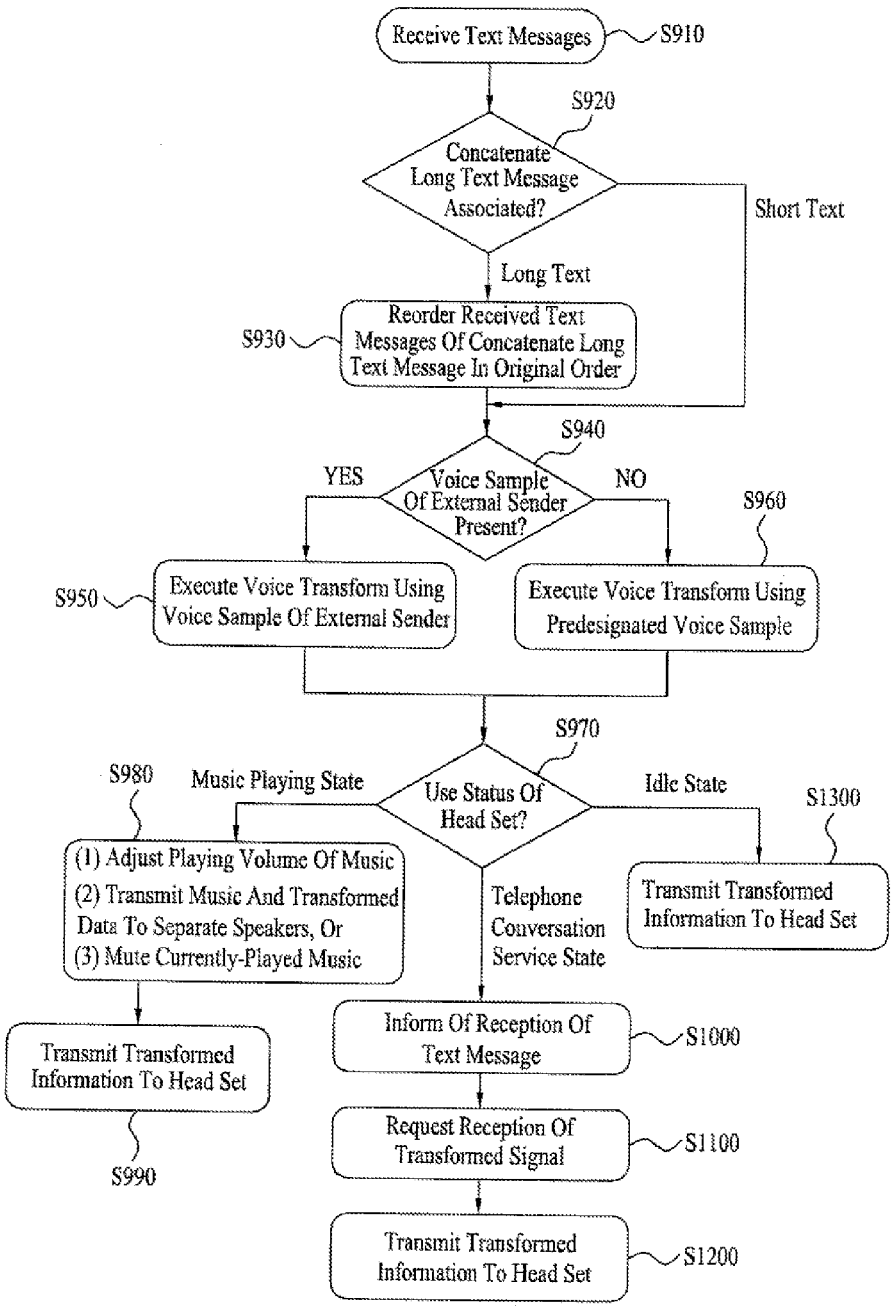

COMMUNICATION DEVICE TRANSFORMING TEXT MESSAGE INTO SPEECH

The present application is a 37 C.F.R. §1.53(b) continuation of U.S. patent application Ser. No. 13/924,199 filed Jun. 21, 2013, which is a continuation of U.S. patent application Ser. No. 13/645,232 filed Oct. 4, 2012, now U.S. Pat. No. 8,510,114, issued Aug. 13, 2013, which is a continuation of U.S. patent application Ser. No. 12/400,537 filed Mar. 9, 2009, now U.S. Pat. No. 8,285,548, issued Oct. 9, 2012, which claims the benefit of U.S. Provisional Application No. 61/035,043 filed on Mar. 10, 2008, the entire contents of all of the above applications are hereby incorporated by reference.

BACKGROUND OF THE INVENTION

1. Field of the Invention

The present application relates to a communication device. The present application also relates to a method of processing text information, using the communication device.

2. Discussion of the Related Art

A communication device has been widely used. The communication device can perform voice communication and/or video communication. Recently, such a communication device has been extended up to a personal computer (PC) function.

Functions executable using such a communication device may include functions of playing music and receiving text information (hereinafter, referred to as a "text message"). Also, as an auxiliary device of such a communication device, an external sound (including music) reproduction device is used. Generally, such an external sound reproduction device is connected to the communication device in a wired or wireless manner. For example, the external sound reproduction device includes an ear phone or head set. The following description will be given in conjunction with an example in which the external sound reproduction device is a head set having a wireless communication function.

Generally, a wireless head set, to which a wireless communication module is mounted, has a main object to perform voice communication with a communication device spaced apart from the wireless head set by a certain distance, to enable the user to talk over the communication device with a counterpart. Meanwhile, conventional communication devices have a function of simply displaying a received text message. For this reason, it may be difficult for the user of such a conventional communication device to identify a received text message. In particular, when the communication device is spaced apart from the user, for example, when the communication device is contained in a bag carried by the user, the user cannot easily identify the text image.

The communication device or wireless head set, which will be described hereinafter, may be implemented, using any near field communication system. Although a Bluetooth system is illustrated as the near field communication system, in the following description, for easy understanding of the present application, the present application is not limited thereto. Other near field communication systems, for example, a Wibree system, an ultra low power (ULP) Bluetooth system, a wireless fidelity (WIFI) system, a Zigbee system, and an infrared data association (IrDA) communication system, may be used. Also, the communication device described in the following description is not limited to a specific product (for example, a mobile phone or a personal digital assistant (PDA)). It will be appreciated that the communication device may be any electronic device having a communication function.

SUMMARY OF THE INVENTION

Accordingly, the present application is directed to a communication device and a method of processing a text message in the communication device.

An object of the present application is to provide a method and apparatus for transforming a text message received by a communication device into voice data, and transmitting the voice data to a wireless head set.

Another object of the present application is to provide a method and apparatus for transforming a text message received by a communication device into voice data, and transmitting the voice data to an external sound reproduction device.

Additional advantages, objects, and features of the present application will be set forth in part in the description which follows and in part will become apparent to those having ordinary skill in the art upon examination of the following or may be learned from practice of the present application. The objectives and other advantages of the present application may be realized and attained by the structure particularly pointed out in the written description and claims hereof as well as the appended drawings.

To achieve these objects and other advantages and in accordance with the purpose of the present application, as embodied and broadly described herein, a method of processing a text message in a communication device comprises: receiving a text message from an external sender; receiving a request to transform the text message into voice data; transforming the received text message into voice data according to the request; and transmitting the voice data to an external sound reproduction device through a wireless communication module.

A further aspect of the present application is a method of processing a text message in a communication device, the method comprising: receiving a text message from an external sender; determining whether a voice sample corresponding to the external sender is present in a storage unit of the communication device; transforming the received text message into voice data using the voice sample corresponding to the external sender if the voice sample is present in the storage unit; transforming the received text message into voice data using a predesignated voice sample if the voice sample corresponding to the external sender is not present in the storage unit; and transmitting the transformed voice data to an external sound reproduction device through a wireless communication module.

A further aspect of the present application is a method of processing a text message in a communication device, the method comprising: receiving a text message from an external sender; transforming the received text message into voice data; checking whether an external sound reproduction device is reproducing a sound; generating control information for controlling a playing volume of the sound if the external sound reproduction device is reproducing the sound; and transmitting the control information and the transformed voice data to the external sound reproduction device through a wireless communication module.

The control information may control the playing volume of the sound to be reduced or muted.

A further aspect of the present application is a method of processing a text message in a communication device, the method comprising: receiving a text message from an external sender; transforming the received text message into voice data; checking whether an external sound reproduction device is reproducing sound data which is transmitted by the communication device itself; and transmitting the sound data to the external sound reproduction device through a first channel and the transformed voice data to the external sound reproduction device through a second channel, if the external sound reproduction device is reproducing the sound data, wherein the first channel and second channel are physically separated and are used for the external sound reproduction device.

A further aspect of the present application is a method of processing a text message in a communication device, the method comprising: receiving at least two text messages from an external sender; determining whether the received at least two text messages are associated with a concatenate single-message; reordering the received at least two text messages in an order of reception of the at least two text messages; transforming the received at least two text messages into voice data according to a result of the reordering; and transmitting the transformed voice data to the external sound reproduction device through a wireless communication module.

A further aspect of the present application is a communication device having a wireless communication module, the device comprising: a receiver configured to receive a text message from an external sender; and a controller configured to execute control operations to receive a request to transform the text message into voice data, to transform the received text message into voice data according to the request, and to transmit the voice data to an external sound reproduction device through the wireless communication module.

A further aspect of the present application is a communication device having a wireless communication module, the device comprising: a receiver configured to receive a text message from an external sender; a storage unit configured to store voice samples; and a controller configured to execute control operations to determine whether a voice sample corresponding to the external sender is present in the storage unit, to transform the received text message into voice data using the voice sample corresponding to the external sender if the voice sample is present in the storage unit, to transform the received text message into voice data using a predesignated voice sample if the voice sample corresponding to the external sender is not present in the storage unit, and to transmit the transformed voice data to an external sound reproduction device through the wireless communication module.

A further aspect of the present application is a communication device having a wireless communication module, the device comprising: a receiver configured to receive a text message from an external sender; and a controller configured to execute control operations to transform the received text message into voice data, to check whether an external sound reproduction device is reproducing a sound, to generate control information for controlling a playing volume of the sound when the external sound reproduction device is reproducing the sound, and to transmit the control information and the transformed voice data to the external sound reproduction device through the wireless communication module.

The control information generated from the controller may control the playing volume of the sound to be reduced or muted.

A further aspect of the present application is a communication device having a wireless communication module, the device comprising: a receiver configured to receive a text message from an external sender; and a controller configured to execute control operations to transform the received text message into voice data, to check whether an external sound reproduction device is reproducing sound data which is transmitted by the communication device itself, and to transmit the sound data to the external sound reproduction device through a first channel and the transformed voice data to the external sound reproduction device through a second channel, when the external sound reproduction device is reproducing the sound data, wherein the first channel and second channel are physically separated and are used for the external sound reproduction device.

A further aspect of the present application is a communication device having a wireless communication module, the device comprising: a receiver configured to receive text messages from an external sender; and a controller configured to execute control operations to determine whether at least two of the received text messages are associated with a concatenate single-message, to reorder the at least two text messages in an order of reception of the at least two text messages, to transform the at least two text messages into voice data according to a result of the reordering, and to transmit the transformed voice data to the external sound reproduction device through the wireless communication module.

It is to be understood that both the foregoing general description and the following detailed description of the present application are exemplary and explanatory and are intended to provide further explanation of the present application as claimed.

BRIEF DESCRIPTION OF THE DRAWINGS

The accompanying drawings, which are included to provide a further understanding of the present application and are incorporated in and constitute a part of the present application, illustrate embodiment(s) of the present application and together with the description serve to explain the principle of the present application. In the drawings:

FIG. 9 is a flow chart illustrating a method for processing a text message in a communication device according to another embodiment of the present application.

DETAILED DESCRIPTION OF THE INVENTION

Reference will now be made in detail to the preferred embodiments of the present application, examples of which are illustrated in the accompanying drawings.

Figure 1:
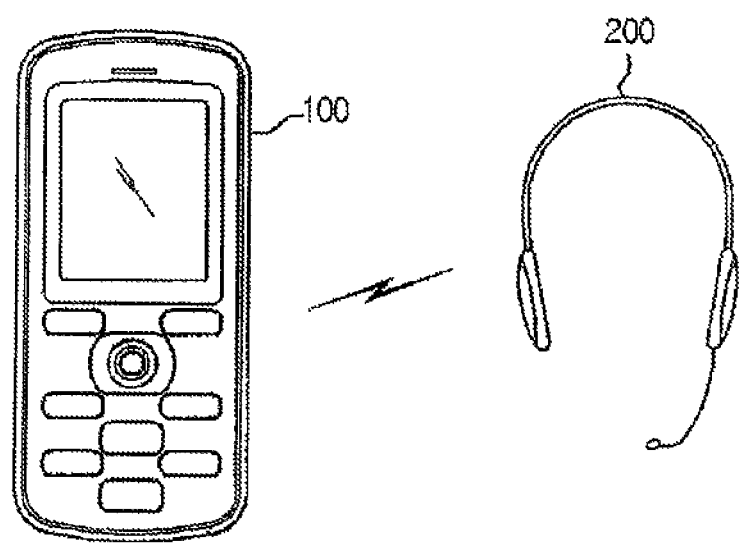
FIG. 1 is a front view schematically illustrating a communication device and a wireless head set according to an exemplary embodiment of the present application.

FIG. 1 is a front view schematically illustrating a communication device 100 and a wireless head set 200 according to an exemplary embodiment of the present application.

FIG. 1 schematically illustrates a state in which a voice signal transformed, by a voice transformer (which will be described later), from message information received by the communication device 100 when the message information is received by the communication device 100 is transmitted to the wireless head set 200, using a wireless communication system, for example, a Bluetooth system.

Figure 2:
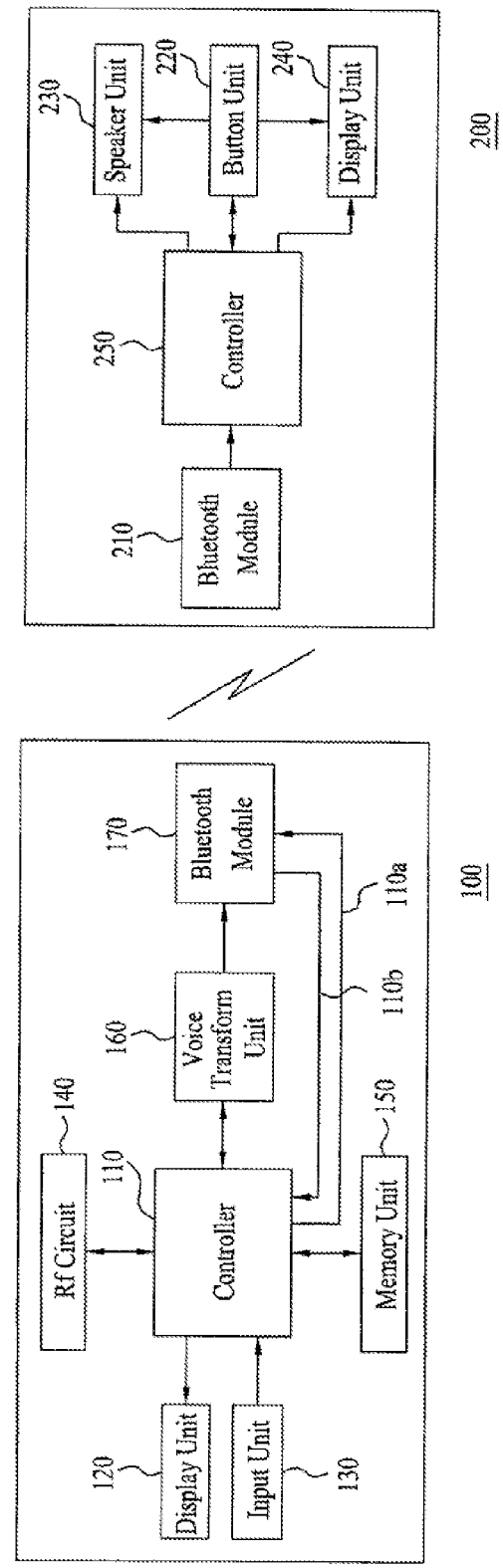
FIG. 2 is a block diagram illustrating configurations of the communication device and wireless head set according to an exemplary embodiment of the present application.

FIG. 2 is a block diagram illustrating configurations of the communication device 100 and wireless head set 200 according to an exemplary embodiment of the present application. The communication device 100 according to the illustrated embodiment of the present application includes a display unit 120, an input unit 130, a radio frequency (RF) circuit 140, a controller 110, a memory 150, a voice transformer 160, and a Bluetooth module 170.

The display unit 120 includes a general display device, which may be equipped in general communication devices. The display unit 120 functions to display various information, to enable the user to view the displayed information. For the display unit 120, a liquid crystal display (LCD), organic light emitting diodes (OLEDs), etc. may be used.

The input unit 130 may include various input elements such as a key pad, a jog shuttle, a point stick, a touch screen, and a touch pad. The input unit 130 may be used to select a function desired by the us to input information desired by the user.

The RF circuit 140 is a circuit to enable the communication device 100 to perform transmission and reception of voice and control information with a base station in a wireless manner. The RF circuit 140 performs communications with the base station via an antenna. The RF circuit 140 also receives a text message transmitted from an external sender via the RF circuit 140.

The controller 110 controls the overall operation of the communication device 100. The controller 110 may be implemented by a microprocessor or a digital signal processor (DSP). In this connection, processes in various embodiments according to the present application are controlled by the controller 110. They will be described in detail later in conjunction with the associated embodiments.

The memory 150 stores program or data required to operate the communication device 100. For the memory 150, an erasable programmable read only memory (EPROM), a static random access memory (SRAM), a flash memory, etc. may be used. The memory 150 may store message information such as a text message (short message service (SMS) message), an e-mail, a multimedia message system (MMS) message.

The voice transformer 160 transforms the received message information into a voice signal. For a technique to transform message information into a voice signal, a text to speech (US) transform technique may be used. The transformed voice signal may be transmitted in a wireless manner, using a protocol recommended by a Bluetooth standard for Bluetooth near field communication.

Figure 4:
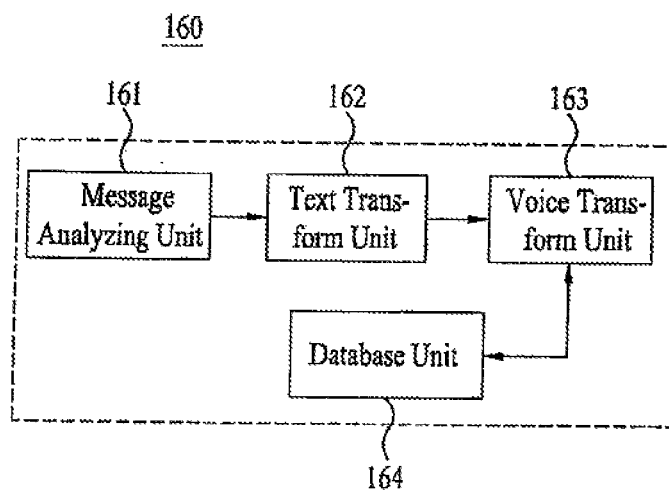
FIG. 4 is a block diagram illustrating a detailed configuration of a voice transformer according to an exemplary embodiment of the present application.

The voice transformer 160 will be shown in detail in FIG. 4. Generally, the voice transformer 160 is implemented by a text to speech server. The voice transformer 160 includes a message analyzing unit 161 for identifying the kind of a message received by the communication device 100, and analyzing and interpreting the message, a text transform unit 162 for transforming the result of the analysis performed by the message analyzing unit 161 into text information, a voice transform unit 163 for re-transforming the text information transformed by the text transform unit 162 into a voice, and a database unit or storage unit 164 for storing various voice information.

The database unit 164 stores various voice types, in order to set a voice type designated by the user. For example, the database unit 164 may store voice types such as a man voice type, a woman voice type, a child voice type, a baby voice type, and an aged voice type. In another embodiment, which will be described later, the database unit 164 may be set to output the received message information in the form of a voice corresponding to the voice of the external sender, using the voice information of the external sender. For example, when a text message from a particular external sender is received, the database unit 164 may be configured to enable the text message to be transformed into a voice of the external sender in accordance with a voice synthesis.

In order to implement such a configuration, the database unit 164 may store data of voice samples corresponding to respective external senders. The communication device may also store voice samples of popular singers, talents, famous persons, etc. favorite to the user, to enable the received message to be transformed into a voice in accordance with a voice synthesis using the voice sample selected by the user. In this case, the user of the communication device may sample voice information of all persons whose telephone numbers are stored in the communication device, through voice recording. When the user talks over the communication device with a counterpart, the voice of the counterpart may also be automatically recorded by a particular device equipped in the communication device, to sample the voice information of the counterpart. In addition, desired voice samples may be downloaded to the communication device over the Internet so that they may be subsequently used. The information sampled using the above-described methods is stored in the database unit 164, so that it may be used to transform message information into a voice. If there is no voice sample of the external sender stored in the database unit 164, the voice sample may be sampled during a telephone conversation of the user with the external sender, to be stored in the database unit 164. For an external sender whose voice sample is stored in the database unit 164, the stored voice sample may be used as it is, or his voice information may be newly sampled to substitute for the stored voice sample.

That is, when the user of the communication device 100 makes a telephone conversation with a counterpart, the communication device 100 first determines whether there is a voice sample of the counterpart stored in the communication device 100. For a new external sender or receiver whose voice sample is not stored, the communication device 100 may sample voice information during the telephone conversation.

Accordingly, it is possible to maximize the convenience in terms of user interface because the received message is transformed into a voice, using the voice of the external sender, not a standardized mechanical sound stored in the communication device.

In an exemplary embodiment, the kind of the received message is identified by the controller 110 which, in turn, sends information as to the identified message kind to the voice transformer 160. In another embodiment, when the message kind identified by the controller 110 is an MMS message or an e-mail containing an image, for example, a video image, the video and audio signals associated with the message may be transmitted in a synchronized state, using a wireless communication system, without a transform thereof by the voice transformer 160, in order to enable the user to identify the message.

For example, where the communication device 100 uses a Bluetooth wireless head set using a Bluetooth wireless communication system, namely, the wireless head set 200, the wireless head set 200 makes a voice conversation, using a head set profile when it is connected with the communication device 100 in a wireless manner. In this case, when a call is made, the communication device 100 operates as an audio gateway device for input and output signals, whereas the Bluetooth wireless head set 200 operates in a remote audio input/output manner. In this case, accordingly, inputting/outputting of audio signals is changed from a speaker and a microphone equipped in the communication device 100 to a speaker and a microphone equipped in the Bluetooth wireless head set 200.

An MMS message or an e-mail containing a still/moving image may be received by the communication device 100. In this case, it may be difficult or troublesome for the user to directly use the communication device. Using a method according to an exemplary embodiment of the present application, the user may easily identify such a message.

For example, if the head set 200 includes a certain display screen, and an RF communication module enabling the head set to perform transmission/reception of not only audio data, but also video data in a wireless manner, it is possible to identify the MMS message or the image attached to the e-mail, using the standard according to the used wireless communication system, without directly controlling the communication device.

Using a protocol recommended by such a Bluetooth standard, it may be possible to implement a technique for reproducing a text message transformed into TTS data in accordance with an exemplary embodiment of the present application. The information transformed into a voice signal by the voice transformer 160 is transferred to the Bluetooth module 170. The voice signal transferred to the Bluetooth module 170 is transmitted to the Bluetooth module 210 included in the wireless head set 200. The voice signal is then output from a speaker unit 230 included in the wireless head set 200 after being transformed into an audible sound by the speaker unit 230. Using a button unit 220, it may be possible to execute various setting operations associated with voice message reception, volume, music play/stop, etc. The button unit 220 of the head set may be equally applied to the communication device 100.

The message information may include various information, namely, a text message, time information, alarm information, position information, etc.

As described above, the wireless head set 200 according to the illustrated embodiment of the present application may include the Bluetooth module 210 capable of receiving message information transformed into voice data through a wireless communication. The wireless head set 200 may further include a Bluetooth interface (not shown) capable of interfacing signals with the Bluetooth module 210.

The wireless head set 200 also includes a display unit 240, to display various status information generated during operation of the head set 200. The wireless head set 200 can execute operation of a call button or adjustment of call/volume. The wireless head set 200 sends key input data corresponding to a key pressed by the user. The button unit 220 may include a knob (not shown) for selecting a reproduction speed of a music or a voice signal corresponding to the received message information, or selecting a message to be reproduced.

When an alarm or the like informing of reception of a text message is received from the communication device 100, the user presses the call button or another button included in the button unit 220, to identify the text message in the form of a voice message. The wireless head set 200 may be set such that a mode to output the voice message is stopped when the user re-presses the button, or automatically stopped when the voice message is completely output.

Hereinafter, configurations of the communication device 100 and wireless head set 200, transmission methods, and various application examples according to various embodiments of the present application will be described in detail.

First Embodiment of Method of Processing Text Message in Communication Device

Figure 3:
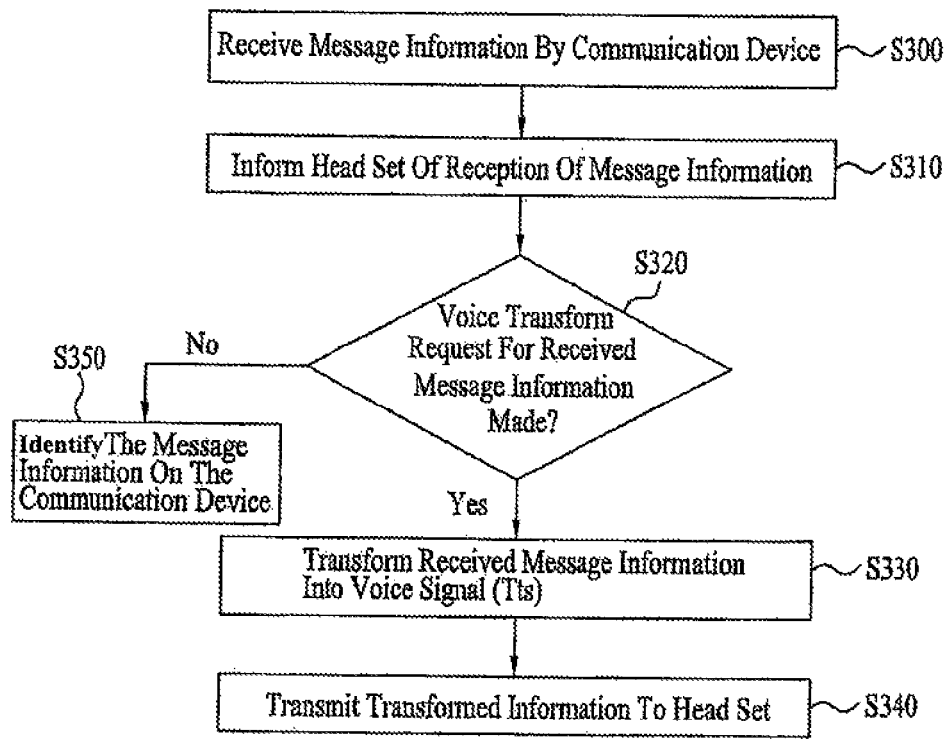
FIG. 3 is a flow chart illustrating a method for processing a text message in a communication device according to an exemplary embodiment of the present application.

FIG. 3 illustrates a method for processing a text message in a communication device according to a first embodiment of the present application.

The method according to this embodiment includes step S300 of receiving message information by the communication device, and discriminating the kind of the received message information, step S310 of informing the wireless head set of the reception of the message information, step S320 of checking whether the message information is to be transformed into a voice signal, step S330 of transforming the received message information into a voice signal when it is determined, based on the result of the checking, that there is a voice transform request, and step S340 of transmitting the transformed voice signal to the wireless head set in a wireless communication manner.

Where the voice transform request has been set as a default in a certain use example, the step of checking whether the message information is to be transformed into a voice signal, may be dispensed with. Also, where there is no voice transform request, it is possible for the user to directly identify the message information on the communication device (S350).

Various message information, for example, an SMS message, an e-mail, an MMS message, etc. may be received by the communication device. When such message information is received by the communication device, the user can identify the received message information through the display unit 120, if he can easily access the communication device. Also, where the wireless head set includes a display screen, it is possible to display a specific icon, for example, an text or graphic icon, on the display screen. In a certain use example, It may also be possible to set the wireless head set such that the wireless head set displays different icons respectively corresponding to the SMS message, MMS message, and e-mail.

In an use example in which the wireless head set does not include a display screen or is unsuitable for the display of an icon, it may be possible to inform the wireless head set of the reception of the message information, using a specific sound (an alarm or the like) or vibration.

The sound may have various types. For example, when it is determined that, in a telephone number list stored in the communication device, there is the same information as the telephone number of the external sender, after matching of the telephone number with the telephone number list, it is possible to inform the wireless head set of whether it is desired to receive the message sent from the external sender, together with information as to the external sender, for example, a caller ID. In this case, the caller ID may also be sent after being transformed into a voice signal. In order to enable the user to preferentially identify the external sender, the caller ID may be transformed into a voice signal which is, in turn, sent to the head set, preferentially over the voice signal of the message. In this case, accordingly, the user can determine whether it is desired to receive the message, preferentially over the transform of the message. In an use example in which the wireless head set includes a light emitting device such as a light emitting diode (LED), it is possible to inform the user of the reception of the message information by turning on the LED to cause the LED to emit light.

If voice transform is executed even for an advertising message, a spam message, or the like, the user may be inconvenienced. Accordingly, it is desirable to appropriately filter such a message by the communication device.

The filtering function is to previously cut off message information containing a specific number or pattern set by the user. For the cut-off message information meeting such a condition, no voice transform may be executed.

For example, when a specific number, for example, "060" or "080", is prefixed to the telephone number, the controller 110 recognizes the telephone number as a spam number, and so filters the associated message information. Also, a specific pattern may be set to filter message information containing a specific spam word (for example, "loan").

The controller 110 may also be set to generate different sound effects in accordance with different message types, respectively. Alternatively, it may be possible to inform the user of the reception of message information, using an audible message of, for example, "A message YY from Mr. XXX was received.".

In another use example, it may be possible to receive a message transformed into voice data only when the message meets a specific setting environment set by the user, without transforming all message information received by the communication device such that the message information can be sent to the wireless head set. Various user's setting environments may be set in accordance with various use examples. For example, when the communication device receives message information, it may inquire about whether the user desires to request a voice transform. In response to the inquiry, the user may request a voice transform of the message information into a voice signal. Only when the user requests the voice transform, the communication device executes a TTS transform, and transmits the resultant data to the wireless head set.

The communication device may be set to enable the user to receive a voice signal only at a specific time set by the user. It may also be possible to execute a voice transform only in association with a specific number designated by the user. A lock device may also be provided at the communication device or head set, to lock the head set in a voice message reception enable mode, thereby automatically transforming message information into a voice signal, irrespective of whether the user requests a voice transform, and automatically transmitting the voice signal to the head set. In this case, the caller ID may be transformed into a voice signal such that the user hears the caller ID in the form of an audible sound, prior to the voice signal of the message information.

In a certain use example, message information may be received when the communication device is in an on screen mode. In this case, it is general that the communication device is in a state of being grasped by the user's hand or being positioned near the user. In this case, accordingly, it may be unnecessary to transform the message information into a voice signal to be transmitted to the wireless head set. When the user views an image displayed on the display screen of the communication device, it may be possible to output an icon having a message or telephone shape on the display screen. Alternatively, the reception of the message information may be informed by vibrating the communication device or outputting the caller information to the display screen.

On the contrary, when message information is received in a state in which the screen of the communication device is inactive, namely, in an off screen mode, it may be possible to additionally check whether the head set is connected. This checking may be achieved using software installed in the communication device. In accordance with the standard of a near field communication system applied to the wireless head set, for example, a Bluetooth system, a non-connection event may be automatically informed when no electric power is supplied to the head set, or when the head set is positioned beyond a communication possible area of the communication system supported by the communication device. On the other hand, when the head set is positioned within the communication possible area of the communication, system supported by the communication device, and electric power is normally supplied to the head set, a connection event is automatically informed. Accordingly, the communication device can always check whether the head set is in a connected state. This will be described in detail. When information as to the current status of the head set 200 is sent from the head set 200 to the communication device 100 via the Bluetooth module 170, the information is transferred to the controller 110 as status information 110*b*. The controller 110 interprets the status information 110*b*, to identify the current status of the head set 200.

When it is determined, based on the result of the checking, that the head set 200 is in a normally-connected state enabling wireless communication, the communication device 100 transmits the message transformed into voice data to the head set 200. On the other hand, when it is determined, based on the result of the checking, that the head set 200 is not in the connected state, the reception of the message information may be informed to the communication device 100, using a sound, vibration, an icon, etc.

When the communication device is in a standby mode state, the reception of the message information may be informed to the communication device or to the head set, using an alarm or vibration. In this case, the informing of the reception of the message information may be distinguished from the informing of the reception of an incoming call.

Second Embodiment of Method of Processing Text Message in Communication Device

Figure 5:
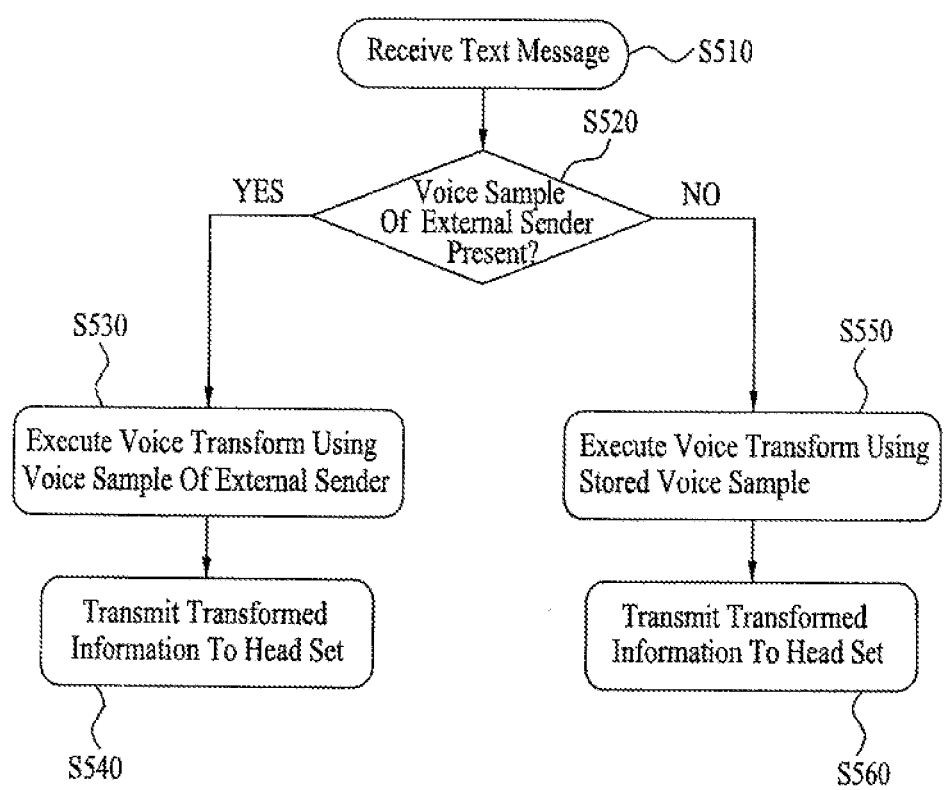
FIG. 5 is a flow chart illustrating a method for processing a text message in a communication device according to another embodiment of the present application.

FIG. 5 illustrates a method for processing a text message in a communication device according to a second embodiment of the present application. The use examples described in conjunction with the first embodiment are equally applicable to the second embodiment. In particular, the second embodiment has features in that a voice transform is achieved using the voice of the external sender.

When a text message is received (S510), the communication device checks whether there is a voice sample of the associated external sender (S520). This checking may be achieved by checking, by the controller 110, whether there is a voice sample of the external sender in the database unit (hereinafter, referred to as a "storage unit") 164 of the voice transformer 160.

If there is a voice sample of the external sender, a voice transform is executed using the voice sample of the external sender (S530). The voice transform is executed through the voice transform unit 163 of the voice transformer 160. The message transformed into voice data is sent to the head set 200 via the Bluetooth module 170 (S540).

If there is no voice sample of the external sender, a voice transform is executed using a predesignated voice sample (S550). The message transformed into voice data is sent to the head set 200 via the Bluetooth module 170 (S560). The "predesignated voice sample" may be a voice sample predesignated in accordance with a setting operation of the user, as described in the first embodiment.

Figure 6A:
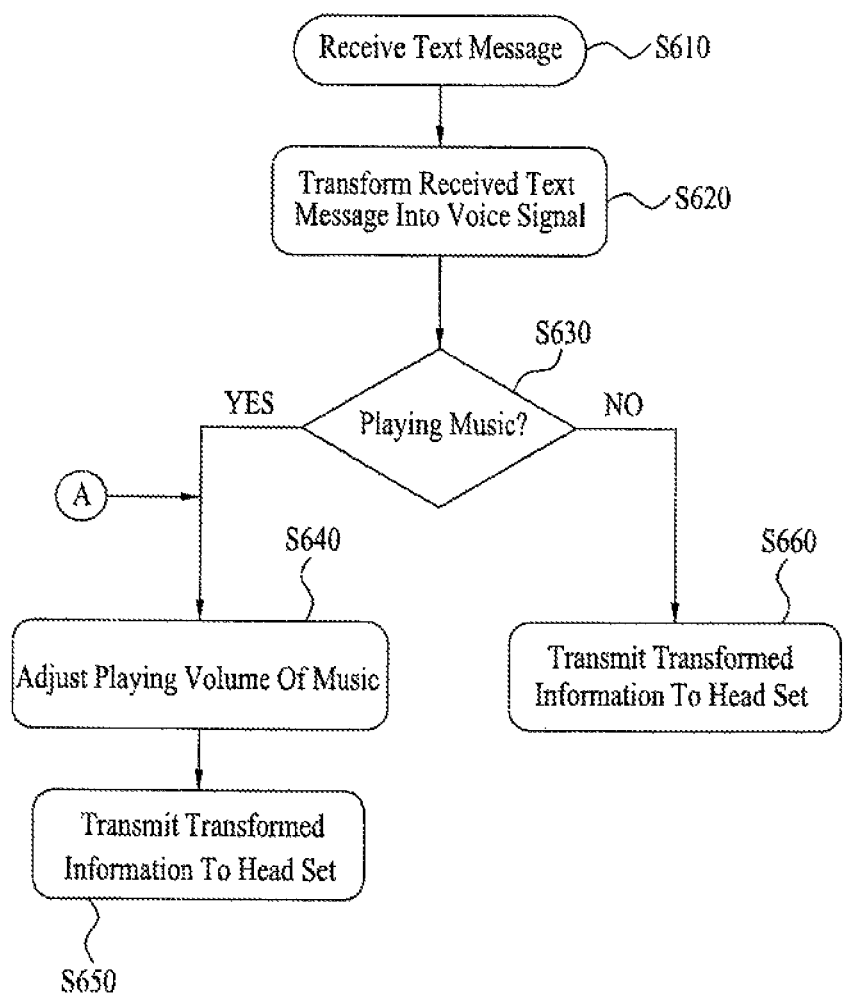
FIGS. 6A to 6C are flow charts illustrating methods for processing a text message in a communication device according to another embodiment of the present application, respectively.
Figure 6B:
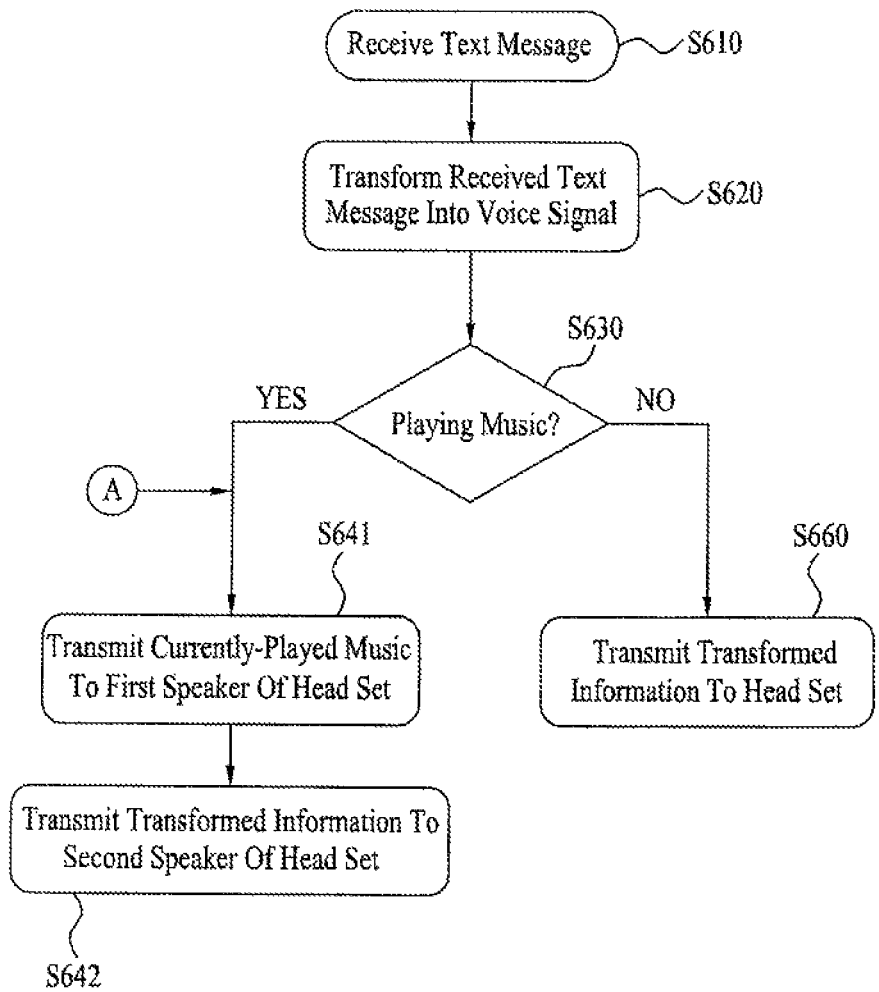
Figure 6C:
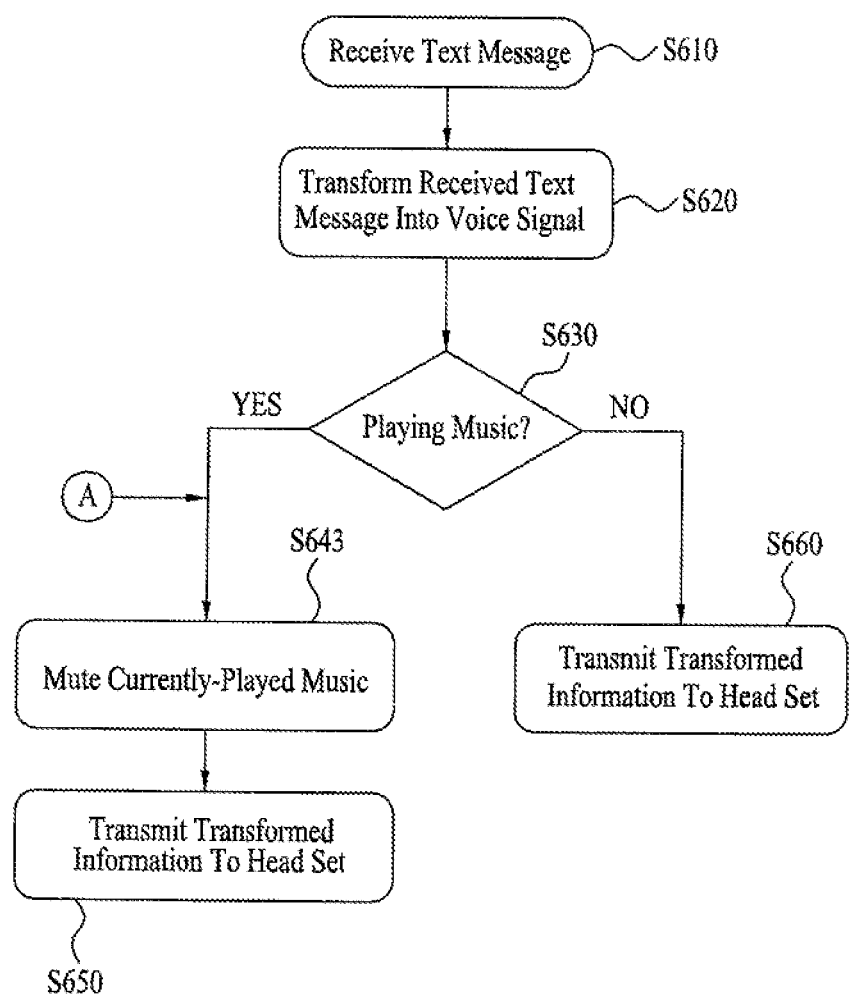

Third Embodiment of Method of Processing Text Message in Communication Device FIGS. 6A to 6C illustrate a method for processing a text message in a communication device according to a third embodiment of the present application. The use examples described in conjunction with the first embodiment are equally applicable to the third embodiment. In particular, the third embodiment is associated with the case in which a specific sound for example, a music) desired by the user is reproduced through the head set.

That is, when message information is received in a state in which the user listens to music through the head set, using a music play function supportable by the communication device, the communication device should inform the head set of the reception of the message information. When the message information received in the state, in which the user listens to music through the head set, is supplied to the user after being transformed into a voice signal, there may be a problem in association with the processing of the sound to which the user listens.

For example, where the user listens to music at a high volume level, there may be an occasion that the user cannot clearly hear the message information transformed into a voice signal. To this end, it may be possible to automatically reduce the volume level of the music when the voice signal is received (FIG. 6A). In accordance with a certain use example, the music, to which the user is listening, and the transformed message may be transmitted through different channels, respectively (FIG. 6B). In accordance with another use example, the music, to which the user is listening, may be paused (FIG. 6C).

FIG. 6A illustrates one use example according to the third embodiment.

When a text message is received (S610), the communication device transforms the text message into a voice signal (S620). The controller 110 then checks whether the head set 200 is playing music (S630). The checking is achieved by interpreting a response signal 110b generated from a controller 250 of the head set 200 in response to a control signal 110a from the controller 110 of the communication device 100.

When it is determined at step S630 that the head set 200 is playing music, the controller 110 generates the control signal 110a to reduce the playing volume of the currently-played music (S640). The controller 110 also transmits the transformed message to the head set 200 (S650). The transmission of the control signal 110a to the head set 200 is achieved via the Bluetooth module 170. The controller 250 of the head set 200 adjusts the volume level of the speaker unit 230 in accordance with the control signal 110a. When it is determined at step S630 that the head set 200 does not play music, the controller 110 transmits the transformed message to the head set 200 (S600). After completion of the listening to the transformed message, the temporarily-reduced volume level is recovered to the original level, to enable the music to be played at the original volume level.

FIG. 6B illustrates another use example according to the third embodiment.

In the use example of FIG. 6B, steps S610, S620, S630, and S660 identical to those in the use example of FIG. 6A are executed. However, if it is determined at step S630 that the head set 200 is playing music, the controller 110 transmits the currently-played music data through a first channel of the head set 200 (this data is reproduced through a first speaker of the head set 200) (S641), while transmitting the transformed message through a second channel of the head set 200 (this message is reproduced through a second speaker of the head set 200) (S642). The controller 250 of the head set 200 controls the music data and message data transmitted through the different channels to be output through the first speaker (for example, a left speaker) and second speaker (for example, a right speaker) constituting the speaker unit 230, respectively.

FIG. 6C illustrates another use example according to the third embodiment.

In the use example of FIG. 6C, steps S610, S620, S630, and S660 identical to those in the use example of FIG. 6A are executed. However, if it is determined at step S630 that the head set 200 is playing music, the controller 110 generates the control signal 110a to mute the currently-played music (S643). The controller 110 also transmits the transformed message to the head set 200 (S650). The controller 250 of the head set 200 temporarily mutes the currently-played music, and outputs the transformed message through the speaker unit 230. After completion of the listening to the transformed message, the controller 250 releases the temporal muting, to enable the music to be played at the original volume level.

Figure 7:
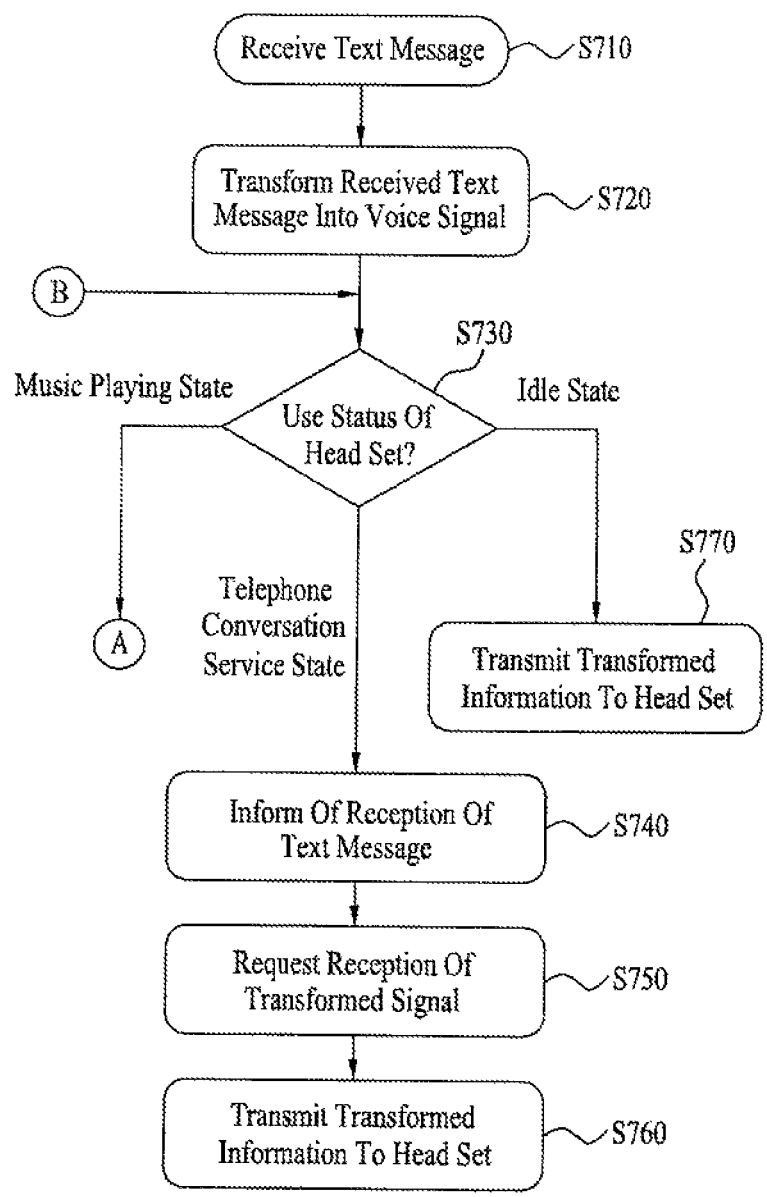
FIG. 7 is a flow chart illustrating a method for processing a text message in a communication device according to another embodiment of the present application.

Fourth Embodiment of Method of Processing Text Message in Communication Device FIG. 7 illustrates a method for processing a text message in a communication device according to a fourth embodiment of the present application. The use examples described in conjunction with the first embodiment are equally applicable to the fourth embodiment. In particular, the fourth embodiment has features in terms of message processing based on the determination of the use status of the head set.

When a text message is received (S710), the communication device transforms the received text message into a voice signal (S720). The communication device then identifies the current use status of the head set 200 (S730). The identification is achieved by interpreting a response signal 110b generated from a controller 250 of the head set 200 in response to a control signal 110a from the controller 110 of the communication device 100.

When the head set 200 is playing music, control operations according to the third embodiment (FIGS. 6A to 6C) are executed. On the other hand, when the head set 200 is in an idle state, the controller 110 transmits the message transformed into the voice signal to the head set 200 (S770). When the head set 200 is in a telephone conversation service state, the controller 110 informs the head set 200 of the reception of the text message (S740), and waits for a request from the user of the head set 200 for the reception of the transformed message (S750). When there is a request from the user of the head set 200 for the reception of the transformed message, the controller 110 transmits the transformed message to the head set 200 (S760). In this connection, the use examples described in conjunction with the first embodiment may be equally applied to steps S740, S750, and S760, so no detailed description thereof will be given.

Figure 8:
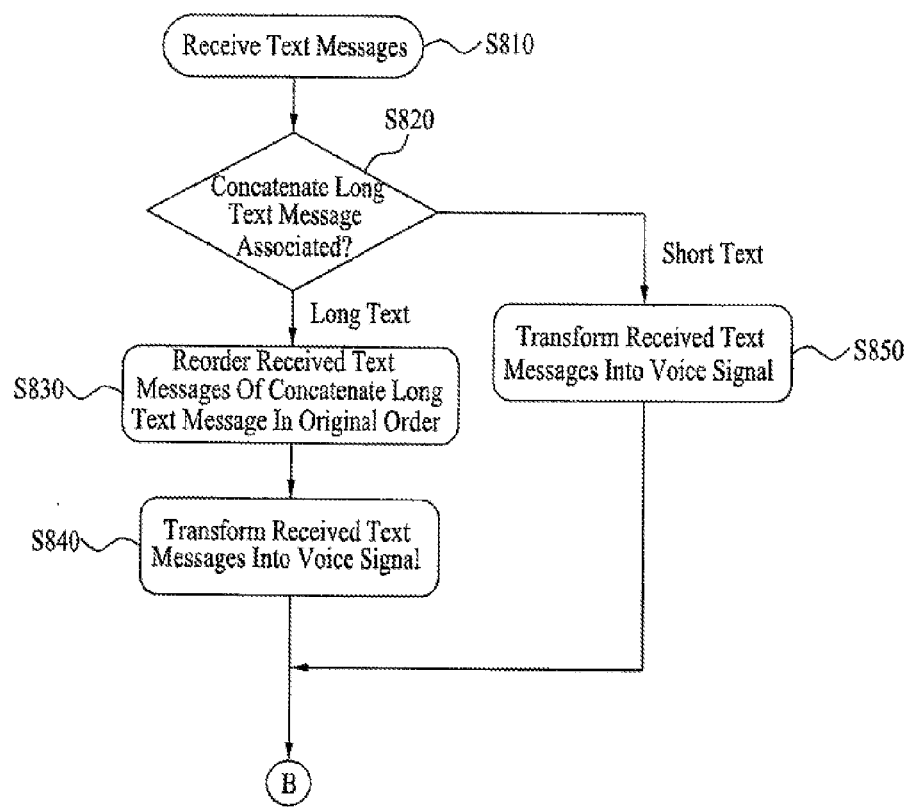
FIG. 8 is a flow chart illustrating a method for processing a text message in a communication device according to another embodiment of the present application.

Fifth Embodiment of Method of Processing Text Message in Communication Device FIG. 8 illustrates a method for processing a text message in a communication device according to a fifth embodiment of the present application. The use examples described in conjunction with the first embodiment are equally applicable to the fifth embodiment. In particular, the fifth embodiment has features in terms of message processing executed when a long text message is received in a divided state.

Generally, text message service provided by communication devices is referred to as "short message service (SMS)". In accordance with SMS, transmission of text is possible within a limited data capacity (for example, 80 Kbytes). In a particular case, however, a text message exceeding the above-described data capacity may be prepared. In this case, the text message is transmitted in the form of a plurality of successive text messages. For example, where the text message prepared by the external sender is 100 Kbytes, a portion of the message corresponding to 80 Kbytes is transmitted as a first text message, and the remaining portion of the message (namely, the 20 Kbyte portion) is transmitted as a second text message. That is, two text messages are successively transmitted.

For the text messages successively transmitted as described above, the communication device first receives the first text message, and then receives the second text message. In a general message displaying method, the second text message received at a later time (namely, most lately received) is first displayed, and the first text message received at a time earlier than that of the second message is then displayed. In this case, the user may be confused. Also, the user may be inconvenienced in conjunction with the identification of the successive text messages. Furthermore, there may be a problem in applying the above-described embodiments of the present application to the voice transform of the successive text messages. The fifth embodiment provides a method capable of solving such problems.

When a text message is received (S810), the communication device checks whether the received text message is associated with a concatenate long text message (S820). For example, when, among text messages received through the RF circuit 140 and stored in the memory 150, there are a plurality of text messages sent from the same external sender and successively received within a predetermined reference time (for example, one second), the controller 110 may determine the text messages sent from the same external sender as a concatenate long text message.

When it is determined at step S820 that the received text message is associated with a concatenate long text message, the controller 110 reorders short text messages constituting the concatenate long text message in an original order, namely, an order of reception of the short text messages (S830). That is, the short text messages constituting the concatenate long text message are reordered in order, starting from a first short text message, which was first received. The order of reordering corresponds to the order of text messages intended by the external sender. The reordered concatenate long text message is then transformed into a voice signal (S840). Thereafter, the same procedure as the procedure of the fourth embodiment starting from step S730 may be executed with regard to the transformed text message (B).

Sixth Embodiment of Method of Processing Text Message in Communication Device

FIG. 9 illustrates a method for processing a text message in a communication device according to a sixth embodiment of the present application. The use examples described in conjunction with the first embodiment are equally applicable to the sixth embodiment. In particular, the sixth embodiment is associated with the case to which the second to fifth embodiments are simultaneously applied.

When a text message is received (S910), the controller 110 of the communication device checks whether the received text message is associated with a concatenate long text message (S920), as in the fifth embodiment (FIG. 8). When it is determined at step S920 that the received text message is associated with a concatenate long text message, the controller 110 reorders short text messages constituting the concatenate long text message in an original order (S930).

Thereafter, the controller 110 checks whether there is a voice sample of the external sender in the database unit (or the storage unit) 164 (S940), as in the second embodiment (FIG. 5). When there is a voice sample of the external sender, the reordered concatenate long text message is transformed into a voice signal, using the voice sample of the external sender (8950).

Subsequently, the controller 110 identifies the current use status of the head set 200 (S970), as in the fourth embodiment (FIG. 7). When the head set 200 is playing music, the controller 110 generates a control signal to adjust the playing volume of the currently-played music, to divide a transmission channel, or to mute the currently-played music (S980), as in the third embodiment (FIGS. 6A to 6C).

On the other hand, when the head set 200 is in a telephone conversation service state or in an idle state, the controller 110 executes steps S1000, S1100, S1200, and S1300 in the same manner as steps S740, S750, S760, and S770 in the fourth embodiment. No detailed description will be given of subsequent steps.

It will be apparent to those skilled in the art that various modifications and variations can be made in the present application without departing from the spirit or scope of the inventions. Thus, it is intended that the present application covers the modifications and variations of this invention provided they come within the scope of the appended claims and their equivalents.

What is claimed is:

1. A mobile terminal, comprising:
   a receiver configured to receive a text message from an external sender; and
   a controller configured to:
   determine whether user control information indicates whether or not to transform the received text message into voice data,
   selectively transform the received text message into the voice data according to the user control information, and
   transmit the voice data to an external sound reproduction device.

2. The mobile terminal of claim 1, wherein the controller is further configured to:
   transform stored caller information corresponding to the received text message into voice data, and
   transmit the caller information voice data to the external sound reproduction device.

3. The mobile terminal of claim 2, wherein the caller information includes at least one of a phone number and a name of a user who sent the text message to the mobile terminal.

4. The mobile terminal of claim 1, further comprising:
   an audio output unit configured to output audio data,
   wherein the controller is further configured to reduce a volume of the output audio data, mute the volume of the output audio data or pause the outputting of the audio data when the voice data is transmitted to the external sound reproduction device.

5. The mobile terminal of claim 1, further comprising:
   a display unit configured to reproduce image data on the mobile terminal,
   wherein the controller is further configured not to transform the text message when the display unit is currently reproducing the image data.

6. The mobile terminal of claim 1, wherein controller is further configured to:
not transform the received text message into voice data when the user control information indicates that a sender of the text message is filtered and not to be transformed into the voice data.

7. The mobile terminal of claim 1, wherein the controller is further configured to:
when the received text message is a concatenated text message including multiple short text messages, reorder the multiple short text messages in order, starting from a first short text message received first,
selectively transform the reordered short text messages into the voice data, and
transmit the voice data to the external sound reproduction device.

8. A mobile terminal, comprising:
a sound reproduction device configured to output audio data;
a receiver configured to receive a text message from an external sender; and
a controller configured to:
determine whether or not the sound reproduction device is currently outputting the audio data, and
selectively transform the received text message into voice data according to a result of the determining, and
transmit the voice data to the sound reproduction device.

9. The mobile terminal of claim 8, wherein the controller is further configured to:
reduce a volume of the audio data when the sound reproduction device is currently reproducing the audio data.

10. The mobile terminal of claim 8, wherein the controller is further configured to:
mute a volume of the audio data when the sound reproduction device is currently reproducing the audio data.

11. The mobile terminal of claim 8, wherein the controller is further configured to:
pause the audio data when the sound reproduction device is currently reproducing the audio data.

12. The mobile terminal of claim 8, wherein the controller is further configured to:
transform stored caller information corresponding to the received text message into voice data, and
transmit the caller information voice data to the sound reproduction device.

13. The mobile terminal of claim 12, wherein the caller information includes at least one of a phone number and a name of a user who sent the message to the mobile terminal.

14. The mobile terminal of claim 8, wherein the controller is further configured to:
not transform the received text message into voice data when the user control information indicates that a sender of the text message is filtered and not to be transformed into the voice data.

15. The mobile terminal of claim 8, wherein the controller is further configured to:
when the received text message is a concatenated text message including multiple short text messages, reorder the multiple short text messages in order, starting from a first short text message received first,
selectively transform the reordered short text messages into the voice data, and
transmit the voice data to the sound reproduction device.

16. The mobile terminal of claim 8, wherein controller is further configured to:
transmit the voice data to a first speaker of the sound reproduction device, and
transmit currently played audio data to a second speaker of the sound reproduction device.

17. A mobile terminal, comprising:
a display configured to reproduce image data on the mobile terminal;
a receiver configured to receive a text message from an external sender; and
a controller configured to:
determine whether or not the display is currently reproducing the image data,
selectively transform the received text message into voice data according to a result of the determining, and
transmit the voice data to an external sound reproduction device.

18. The mobile terminal of claim 17, wherein the controller is further configured to:
not transform the text message when the display is currently reproducing the image data.

19. The mobile terminal of claim 17, wherein the controller is further configured to:
transform the text message when the display is not currently reproducing the image data.

* * * * *